3,497,554
NOVEL ORGANIC COMPOUNDS
William Alan Remers, Suffern, and Martin Joseph Weiss, Oradell, N.Y., assignors to American Cyanamid Company, Stamford, Conn., a corporation of Maine
No Drawing. Filed Apr. 5, 1966, Ser. No. 540,196
Int. Cl. C07c 119/00
U.S. Cl. 260—566                        4 Claims

ABSTRACT OF THE DISCLOSURE

This invention describes the preparation of bis-toluenesulfonates and bis-methanesulfonates from the reaction of a glyoxime and toluenesulfonyl chloride and the reaction of a cyclic dione dioxime and a lower alkanesulfonyl chloride respectively. The compounds are useful for treating disorders of the central nervous system.

---

This invention relates to new organic compounds and to methods of preparing the same. More particularly, the invention relates to novel bis-oxime sulfonates, bis-di(lower)alkylhydrazones and their mono and bis-lower alkyl hydrazonium halogen salts.

The novel compounds of this invention may be represented by the following formula:

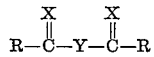

wherein R is a member of the group consisting of hydrogen and lower alkyl; X is a member of the group consisting of $NOSO_2$(lower alkyl), $NOSO_2$(mononuclear aryl), $NN$(lower alkyl)$_2$ and $NN^\oplus$(lower alkyl)$_3$halide$^\ominus$; Y is a member of the group consisting of lower alkylene and phenylene, and when C—Y—C is taken together is a member of the group consisting of 1,4 and 1,2 cyclohexylenes with the proviso that when C—Y—C is 1,4 or 1,2 cyclohexylene, X is a member of the group consisting of $NOSO_2$(lower alkyl), $NN$(lower alkyl)$_2$ and $NN^\oplus$(lower alkyl)$_3$halide$^\ominus$.

The novel compounds of this invention, in general, are white crystalline solids or yellowish oils. They are soluble in the usual organic solvents, such as for example, acetone or benzene, and are insoluble in water. The salts of the compounds are soluble in water. The preparation of the novel compounds of the present invention can be illustrated by the reactions shown in the following flowsheet.

FLOWSHEET

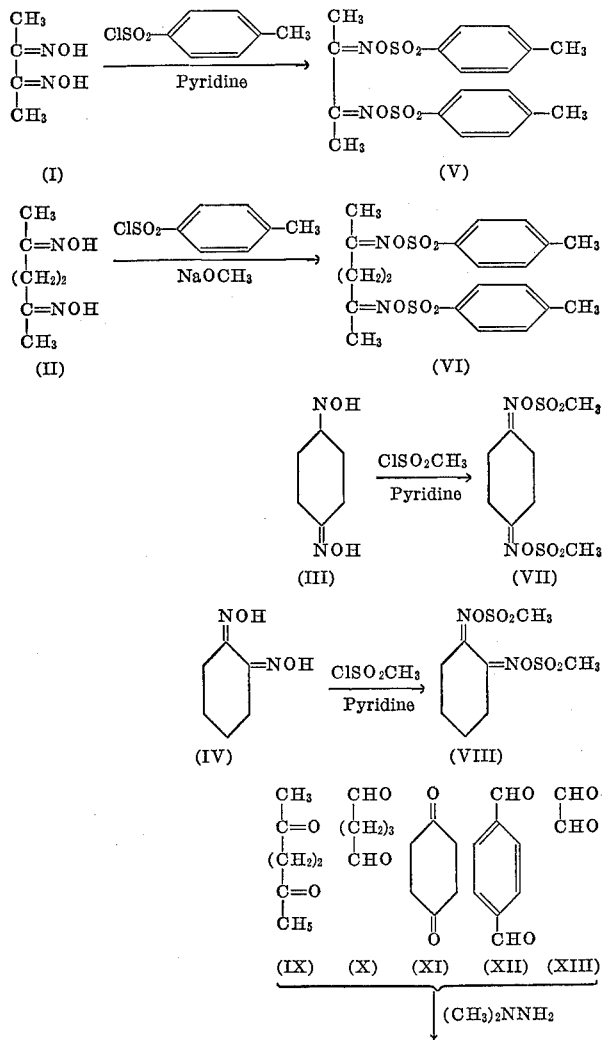

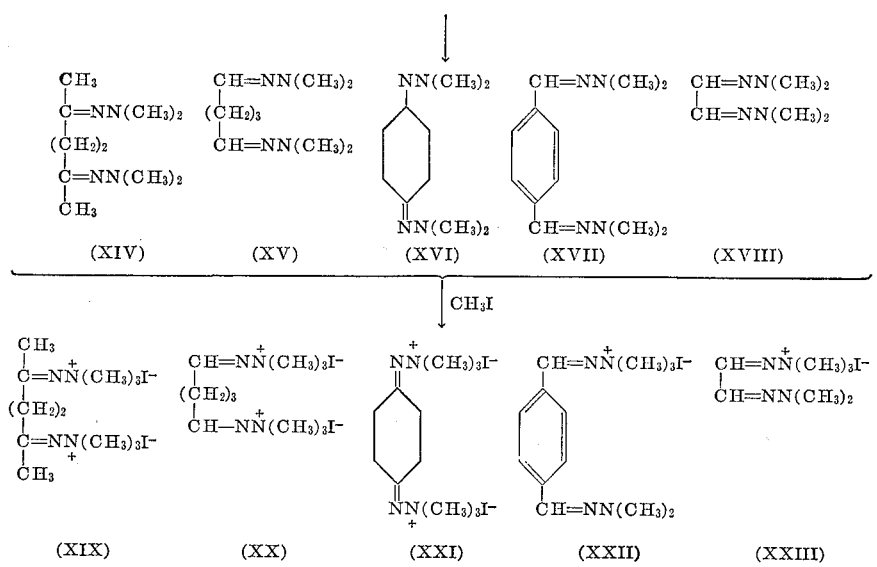

Thus, treatment of a diketoxime such as compound (I) with pyridine and p-toluenesulfonyl chloride or a diketoxime such as compound (II), with a base such as sodium methoxide, and p-toluenesulfonyl chloride produces the corresponding bis-oxime p-toluenesulfonates, compounds (V) and (VI), respectively. Treatment of cyclohexane dioximes such as compounds (III) and (IV) with pyridine and methanesulfonyl chloride gives the corresponding bis-oxime methanesulfonates, compounds (VII) and (VIII) respectively. Treatment of diketones and dialdehydes, such as compounds (IX), (X), (XI), (XII), and (XIII) with a 1,1-di(lower)alkylhydrazine, such as 1,1-dimethylhydrazine in a solvent, such as benzene, gives the corresponding bis-di(lower)alkylhydrazones, compounds (XIV), (XV), (XVI), (XVII), and (XVIII), respectively. When bis-di(lower)alkylhydrazones, such as compounds (XIV), (XV), (XVI), (XVII), and (XVIII), are treated with a lower alkyl halide, such as methyl iodide, the corresponding bis-hydrazonium salts, compounds (XIX), (XX), and (XXI), or the corresponding mono salts, compounds (XXII) and (XXIII), respectively are formed.

The present compounds have been tested in warm blooded animals and found to be effective central nervous system agents. The compounds therefore have an important utility for example, as antidepressants, tranquilizers, hypnotics, etc. in the treatment of CNS disorders.

The compounds of the present invention show CNS depressant properties such as hypnotic and muscle relaxant type activity. This activity is indicated by several procedures. For example, a test which indicates hypnotic and/or muscle relaxant type activity is represented by the following rod walking test. Groups of 6 mice each are tested for their ability to walk across a horizontal rod in a normal manner after receiving graded interperitoneal doses of a compound. A median effective dose (RWD) is estimated.

A test which indicates tranquilizing activity is represented by a measure of the reduction in motor activity. One-half this dose is given to a group of 5 mice and a 5 minute count of motor activity is recorded acetophotometer). Counts of $\leqq 250$ are considered to indicate a specific reduction (more than two standard deviations) of activity at a dose causing only minimal impairment of neurological function as measured by rod walking ability. Compounds that appear to reduce motor activity ($\leqq 250$ count) are administered to additional groups of 5 mice at graded doses and tested similarly. The dose (MDD) which causes a 50% reduction of motor activity (a count of 250) is estimated.

As a test for toxicity or margin of safety, the compounds that did specifically reduce motor activity are given to 10 mice at a dose of 10× MDD. The compounds that did not reduce motor activity are given to 10 mice at a dose of 4× RWD. If more than 50% of the mice die within 24 hours, the compound is rejected for reasons of toxicity or low margin of safety. If 50% of the mice die, the compound is considered interesting for further study.

Interesting compounds are then tested for their ability to cause mice to fall off an inclined (60°) screen and to lose their righting reflex. Doses are estimated that cause 50% of the mice to fall off the inclined screen (ISD) and to lose their righting reflex (LRD).

The products of the present invention as tranquilizers can be incorporated in various pharmaceutical forms such as tablets, capsules, pills and so forth, for immediate or sustained release, by combining with suitable carriers. The daily dose may vary from 10 mg. to 1000 mg. They may be in the form of dosage units for single therapeutic dose or in small units for multiple dosages or in larger units for division into single doses. Obviously, in addition to the therapeutc antidepressant, tranquilizing or hypnotic compounds there may be present excipients, binders, fillers and other therapeutically inert ingredients necessary in the formulation of the desired pharmaceutical preparation.

The following examples describe in greater detail the preparation of representative compounds of the invention.

EXAMPLE 1

Preparation of bis-methanesulfonate of 1,2-cyclohexanedione dioxime (VIII)

An ice-cooled, stirred solution of 2.24 g. of 1,2-cyclohexanedione dioxime in 50 ml. of dry pyridine is treated with 4.58 g. of methanesulfonyl chloride. The mixture is stirred 16 hours at room temperature and then treated with 300 ml. of ice water. The solid that forms is recrystallized from methylene chloride-hexane, giving white crystals of bis-methanesulfonate of 1,2-cyclohexanedione dioxime, melting point 160° C.

EXAMPLE 2

Preparation of bis-methanesulfonate of 1,4-cyclohexanedione dioxime (VII)

Treatment of 1,4-cyclohexanedione dioxime in place of 1,2-cyclohexanedione dioxime by the method described in Example 1 gives bis-methanesulfonate of 1,4-cyclohexanedione dioxime as white crystals, melting point 134–135° C., MDD=210 mg./kg.; non-lethal at 2100 mg./kg.

EXAMPLE 3

Preparation of bis-p-toluenesulfonate of dimethylglyoxime (V)

Treatment of dimethylglyoxime with p-toluenesulfonyl chloride by the method described in Example 1 gives white crystals, melting point 183–185° C. of the desired product.

EXAMPLE 4

Preparation of bis-p-toluenesulfonate of 2,5-hexanedione dioxime (VI)

A mixture of 2.88 g. of 2,5-hexanedione dioxime, 2.21 g. of sodium methoxide, and 70 ml. of benzene is stirred for 40 hours and then cooled in an ice bath and treated with a solution of 7.63 g. of p-toluenesulfonyl chloride in 100 ml. of benzene. The resulting mixture is stirred for 16 hours, filtered, and the solids are dried and recrystallized from methylene chloride-hexane. This procedure gives white crystals, melting point 127° C. of the desired product.

EXAMPLE 5

Preparation of 1,5-pentaendione bis-(1,1-dimethylhydrazone) (XV)

A mixture of 20 ml. of 25% aqueous glutaric dialdehyde, 6.0 g. of 1,1-dimethylhydrazine and 200 ml. of benzene is heated to reflux in a Dean-Stark apparatus. After the theoretical amount of water has been removed (ca. 20 hr.) the benzene solution is concentrated and the residue is distilled under reduced pressure. The desired product, as a pale yellow liquid, $\lambda_{max}$. 6.20$\mu$, is obtained.

EXAMPLE 6

Preparation of 2,5-hexanedione bis-(1,1-dimethylhydrazone (XIV)

Treatment of 2,5-hexanedione in place of glutaric dialdehyde by the procedure described in Example 5 gives the above product as a yellow oil, boiling point 150–155° C. at 7 mm. pressure.

EXAMPLE 7

Preparation of glyoxal bis-(1,1-dimethylhydrazone) (XVIII)

Using the procedure described in Example 5 and substituting glyoxal for glutaric dialdehyde gives the above product as a yellow oil, $\lambda_{max}$. 6.20$\mu$.

EXAMPLE 8

Preparation of 1,4-cyclohexanedione bis-(1,1-dimethylhydrazone) (XVI)

Treatment of 1,4-cyclohexanedione instead of glutaric dialdehyde by the procedure described in Example 5 gives without distillation, white crystals, melting point 71–73° C. of the desired product.

EXAMPLE 9

Preparation of terephthalic dialdehyde bis-(1,1-dimethylhydrazone) (XVII)

Treatment of terephthalic dialdehyde by the procedure described in Example 5 gives, without distillation, white crystals, melting point 162–163° C. of the desired product. The above compound is active as an insecticide.

EXAMPLE 10

Preparation of 1,5-pentanedione bis-(1,1-dimethylhydrazonium)-diiodide (XX)

To 5 ml. of methyl iodide is cautiously added 2 g. of 1,5-pentanedione bis-(1,1-dimethylhydrazone) (Example 5). The solid that forms is recrystallized from methanol-ether. This procedure yields 1,5-pentanedione bis-(1,1-dimethylhydrazonium diiodide) as a white solid, melting point 183° C.

EXAMPLE 11

Preparation of 2,5-hexanedione bis-(1-dimethylhydrazonium) diiodide (XIX)

Treatment of 2,5-hexanedione bis-(1,1-dimethylhydrazone) (Example 6) by the procedure described in Example 10 gives white crystals, melting point 221–224° C. of the desired product.

EXAMPLE 12

Preparation of glyoxal 1,1-dimethylhydrazonium iodide 1,1-dimethylhydrazone (XXIII)

Treatment of glyoxal bis - (1,1-dimethylhydrazone) (Example 7) by the procedure described in Example 10 yields the desired product as a white solid, melting point 195° C.

EXAMPLE 13

Preparation of 1,4-cyclohexanedione bis-(1,1-dimethylhydrazonium)diiodide (XXI)

Treatment of 1,4-cyclohexanedione bis-(1,1-dimethylhydrazone) (Example 8) by the procedure described in Example 10 gives yellowish-green crystals, $\lambda_{max}$. 6.07$\mu$, the desired diiodide.

EXAMPLE 14

Preparation of terephthalic dialdehyde 1,1-dimethylhydrazonium iodide, 1,1-dimethylhydrazone (XXII)

Treatment of terephthalic dialdehyde bis-(1,1-dimethylhydrazone) (Example 9) by the procedure described in Example 10 gives a white solid, melting point 226–228° C., the desired product.

What is claimed is:

1. A compound of the formula:

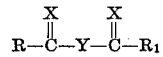

wherein R and $R_1$ are members of the group consisting of hydrogen and lower alkyl; X is a member of the group consisting of NOSO$_2$(lower alkyl) and NOSO$_2$-tolyl; Y is (CH$_2$)$_n$ with $n$ being 0 and 2; R and $R_1$ taken together are lower alkylene with the proviso that when R and $R_1$ taken together are lower alkylene then X is NOSO$_2$(lower alkyl).

2. The compound according to claim 1, bis-p-toluenesulfonate of dimethylglyoxime.

3. The compound according to claim 1, bis-methanesulfonate of 1,4-cyclohexanedione dioxime.

4. The compound according to claim 1, bis-methanesulfontate of 1,2-cyclohexanedione dioxime.

References Cited

UNITED STATES PATENTS 3,142,658   7/1964   Stewart _____ 260—566 XR

OTHER REFERENCES

Domnin et al.: C.A., vol. 51, p. 16314 (1957).
Domnin et al.: C.A., vol. 52, p. 3702 (1958).
Knunyants et al.: C.A., vol. 44, p. 1918 (1950).
Wiley et al.: J. Org. Chem., vol. 22, pp. 204–207 (1957).

FLOYD D. HIGEL, Primary Examiner

U.S. Cl. X.R.

260—999; 424—327